United States Patent
Chang

(10) Patent No.: US 6,802,726 B2
(45) Date of Patent: Oct. 12, 2004

(54) EJECTION MECHANSIM FOR AN ELECTRONIC CARD CONNECTOR

(75) Inventor: Chia-Chen Chang, Hsinchuang (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/446,181
(22) Filed: May 23, 2003
(65) Prior Publication Data

US 2004/0009691 A1 Jan. 15, 2004

(51) Int. Cl.[7] ............................................. H01R 13/62
(52) U.S. Cl. ....................................................... 439/159
(58) Field of Search ................................ 439/159, 160, 439/152

(56) References Cited

U.S. PATENT DOCUMENTS 6,394,827 B2 * 5/2002 Nogami ...................... 439/159

* cited by examiner

Primary Examiner—Ross Gushi
(74) Attorney, Agent, or Firm—Stacey E. Caldwell

(57) ABSTRACT

An ejection mechanism for an electronic card connector, wherein the electronic card connector includes an insulative housing for receiving an electronic card, and the ejection mechanism includes a slider slidably mounted on an arm portion of the insulative housing, a support portion extending from the arm portion of the insulative housing, a lock arm fixed at one end to the slider, wherein the lock arm includes a retention portion for engaging a corresponding slot of the electronic card during insertion and ejection of the card, and a horizontal portion supported on the support portion, whereby it can securely retain the electronic card during card insertion, yet allow easy removal of the electronic card during ejection.

4 Claims, 9 Drawing Sheets

EJECTION MECHANSIM FOR AN ELECTRONIC CARD CONNECTOR

FIELD OF THE INVENTION

The present invention relates to an electronic card connector having an ejection mechanism, and in particularly to an ejection mechanism for both securely retaining yet easily rejecting an electronic card when the card is inserted and rejected, respectively, from the card connector.

DESCRIPTION OF THE RELATED ART

FIG. 1 of the attached drawings shows a convention electronic card connector (shown as Taiwan Patent Application No. 465842), comprising a U-shaped insulative housing 10a having a longitudinal base portion 11a, a first arm portion 12a and a second arm portion 13a extending parallel from two ends of base portion 11a, and a receiving space 14a defined by first arm portion 12a and second arm portion 13a for receiving an electronic card; a plurality of terminals 21a mounted on base portion 11a of insulative housing 10a; and an ejection mechanism 40a mounted on second arm portion 13a of insulative housing 10a which includes a support bar 41a, a slider 42a installed on the support bar 41a, an elastic element 43a and a guiding bar 45a for movement within a groove 44a of slider 42a.

SUMMARY OF THE INVENTION

The purpose of the present invention is to provide an ejection mechanism for an electronic card connector having a lock arm defining a locking force lever which can be adjusted for locking an electronic card and provide different retention forces for an inserted or rejected card, hence it can properly adjust the strength of a retention portion of the lock arm for providing different locking capability, so that the retention portion can securely retain the electronic card during insertion of the card, yet easily reject the card during ejection.

In accordance with one aspect of the invention, the invention provides an ejection mechanism for an electronic card connector, wherein the electronic card connector has a U-shaped insulative housing for receiving an electronic card, and the ejection mechanism includes a slider slidably mounted on an arm portion of the insulative housing, a moment-defining lock arm support portion extending from one arm portion of the insulative housing, and a lock arm fixed on the slider, wherein the lock arm includes a clamping portion and a bottom portion retained on the retained portion.

BRIEF DESCRIPTION OF THE DRAWINGS

Other objects, features and advantages of the present invention will be more apparent from the following detailed description when read in conjunction with the accompanying drawings in which.

DETAILED DESCRIPTION OF THE PREFERRED EMBODIMENT

Figure 1:
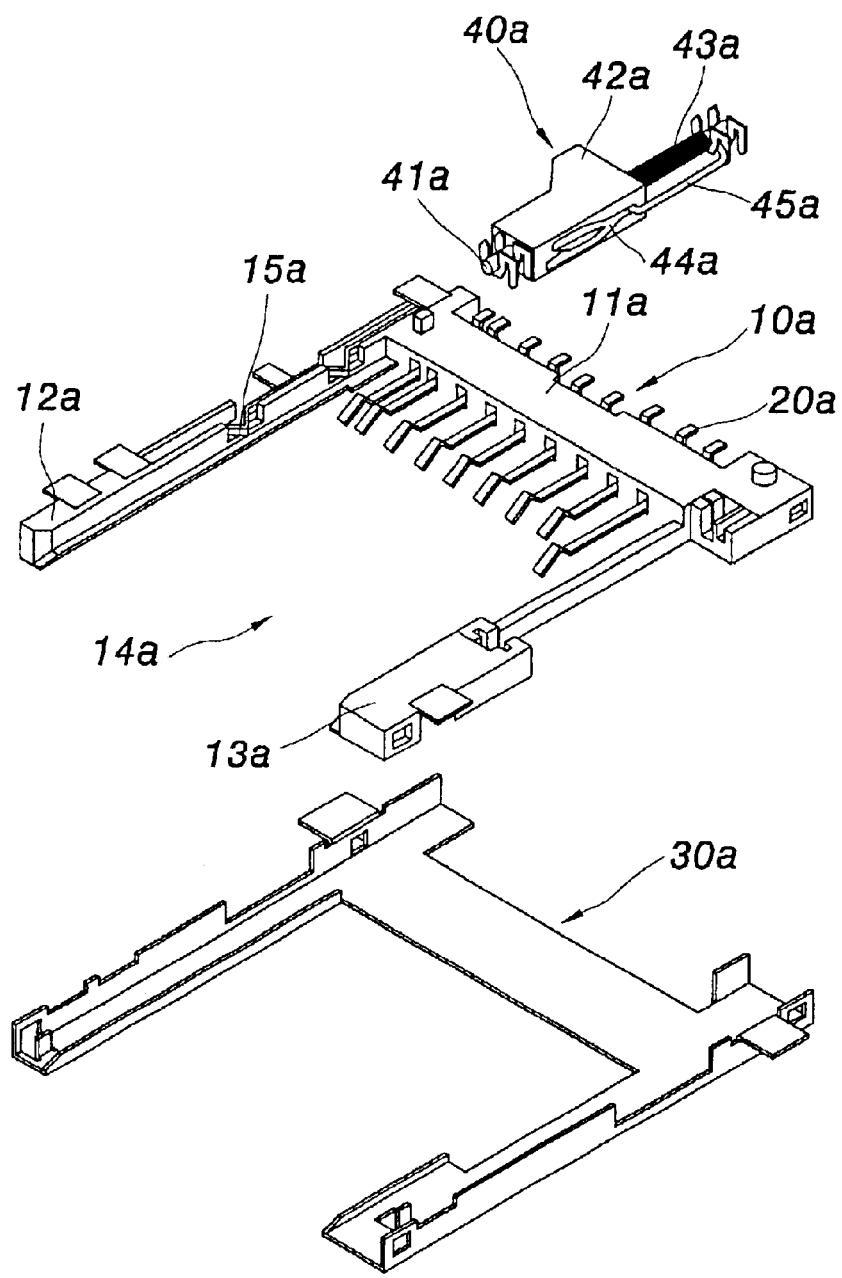
FIG. 1 is a perspective exploded view of a conventional electronic card connector.
Figure 2:
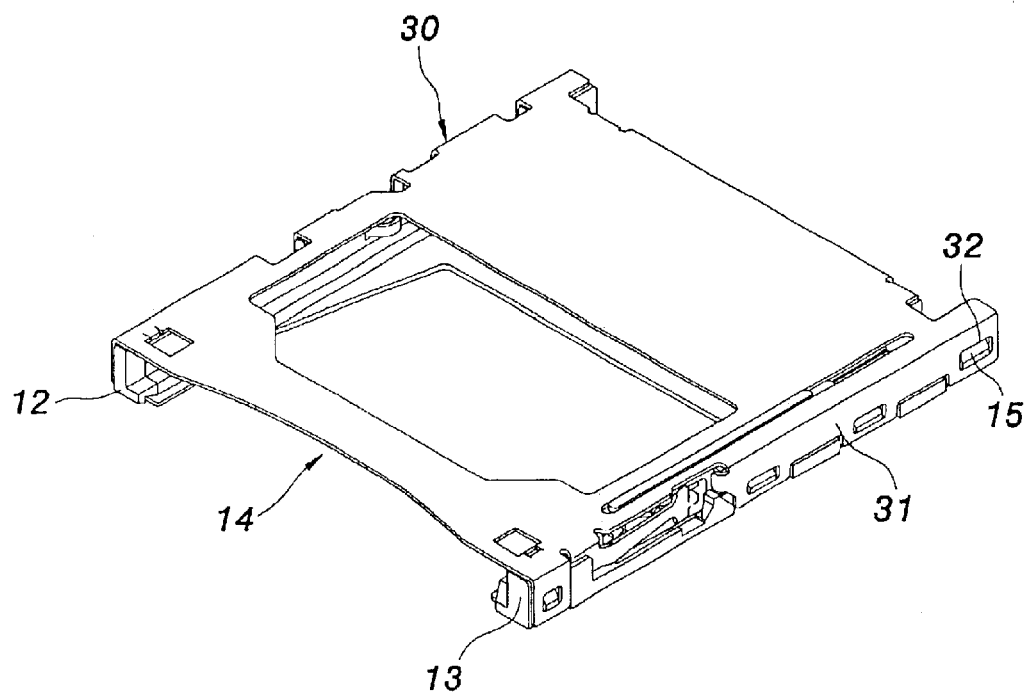
FIG. 2 is a perspective view of an electronic card connector in accordance with the present invention.
Figure 3:
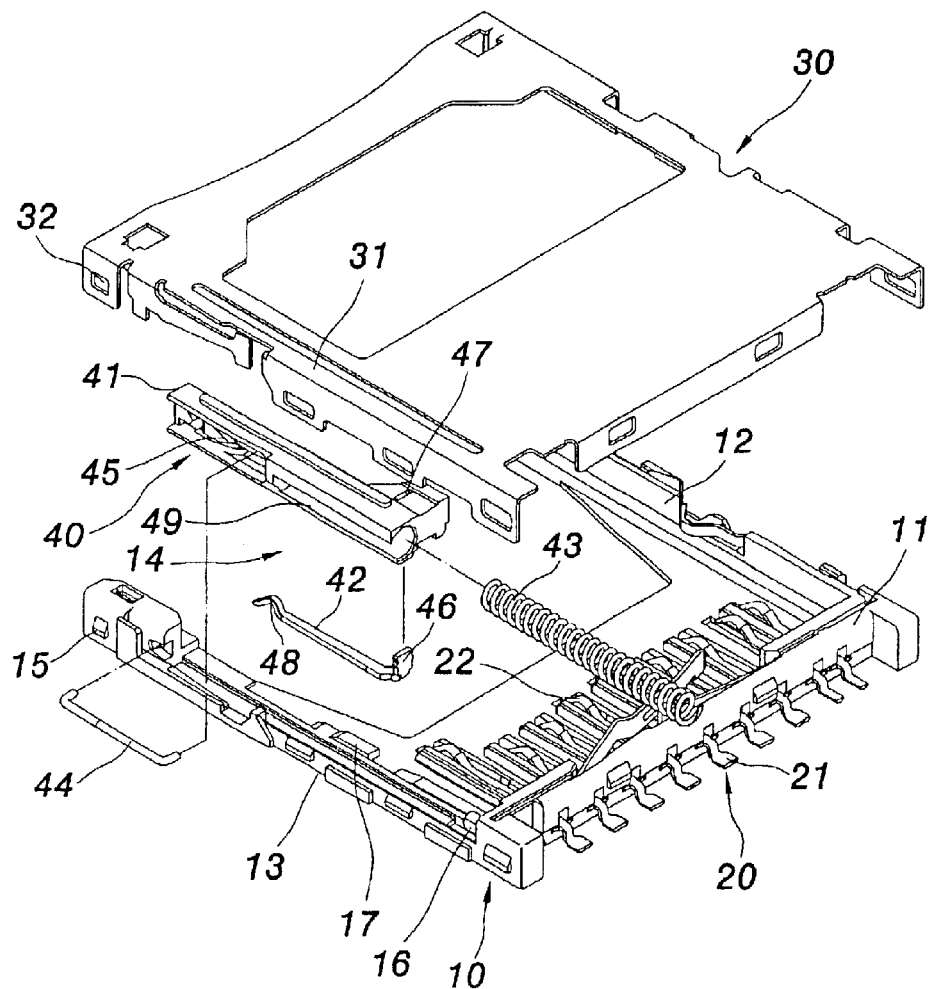
FIG. 3 is a perspective exploded view of the electronic card connector of the present invention.
Figure 4:
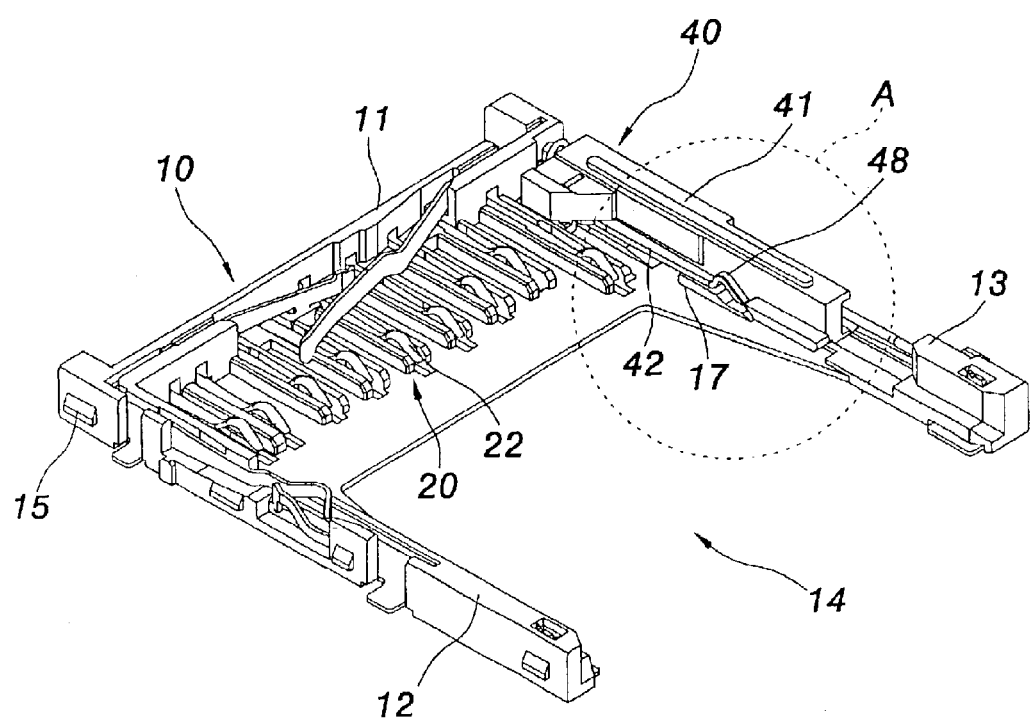
FIG. 4 is an exploded view of the electronic card connector without an insulative housing of the present invention.
Figure 4A:
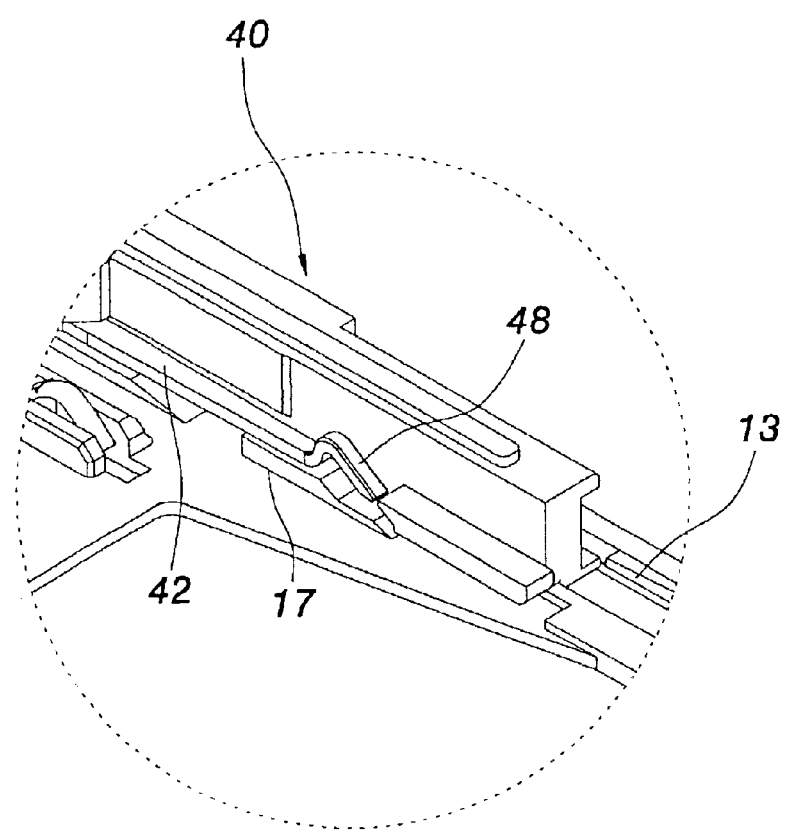
FIG. 4A is a partial detail view of portion "A" of FIG. 4.

A description will now be given of the preferred embodiments of the present invention with reference to the accompanying drawings.

Referring to FIGS. 2 to 7, the present invention is directed to an ejection mechanism for an electronic card connector, which includes an insulative housing 10, a plurality of terminals 20, a metallic shield 30 and an ejection mechanism 40, wherein the insulative housing 10 is U-shaped and includes a longitudinal base portion 11, a first arm portion 12 and a second arm portion 13 extending parallel from two ends of the base portion 11, and a receiving space 14 defined by first arm portion 12 and second arm portion 13 for receiving an electronic memory card or the like.

Terminals 20 are stamped and formed of metallic sheet metal material and are mounted on base portion 11 of insulative housing 10. Terminals 20 each have a solder portion 21 and a contact portion 22, wherein solder portion 21 is adapted to be soldered to a circuit board contact portion 22 is adapted to be electrically connected to corresponding contacts of an electronic card 100 (shown in FIGS. 5 and 6) inserted in receiving space 14.

Metallic shield 30 is stamped and formed of metal material and mounted on insulative housing 10. The shield includes two sides each forming a side board 31, and the side boards 31 each include a plurality of retention holes 32. First arm portion 12 and second arm portion 13 of insulative housing 10 each have a plurality of corresponding retention projections 15 extending outwardly and corresponding to the retention holes 32, thereby allowing metallic shield 30 and insulative housing 10 to be securely held together.

Ejection mechanism 40 is mounted on second arm portion 13 of insulative housing 10 and includes a slider 41, a lock arm 42, an elastic spring element 43 and a guiding bar 44, wherein slider 41 is slidably mounted on second arm portion 13 of insulative housing 10, such that slider 41 can slide forward or backward along second arm portion 13. Slider 41 further includes a groove 45 for defining movement of an inserted and ejected card.

Lock arm 42 is made of metal material, and one end of lock arm 42 has a fixed portion 46 engaged in a hole 47 of slider 41, so that one end of lock arm 42 is fixedly connected to slider 41, hence lock arm 42 moves simultaneously with slider 41. The other end of lock arm 42 has a free end which includes a retention portion 48 projecting upwardly. Insulative housing 10 includes moment defining lock arm support portion 17 extending upwardly from second arm portion 13, whereat support portion 17 is positioned beneath lock arm 42 to support a portion of the lock arm.

Elastic spring element 43 is a compression spring, and one end of the spring element is received in a hole 49 formed on an inner portion of slider 41 and another end of the element is positioned around a column 16, so that elastic spring element 43 is positioned between slider 41 and insulative housing 10 thereby provide a biased force for enabling slider 41 to move backwardly.

One end of guiding bar 44 is fixed on second arm portion 13 of insulative housing 10, and the other end is movably and slidably fitted within groove 45 of slider 41, so that guiding bar 44 can move along groove 45 in two motions.

Figure 5:
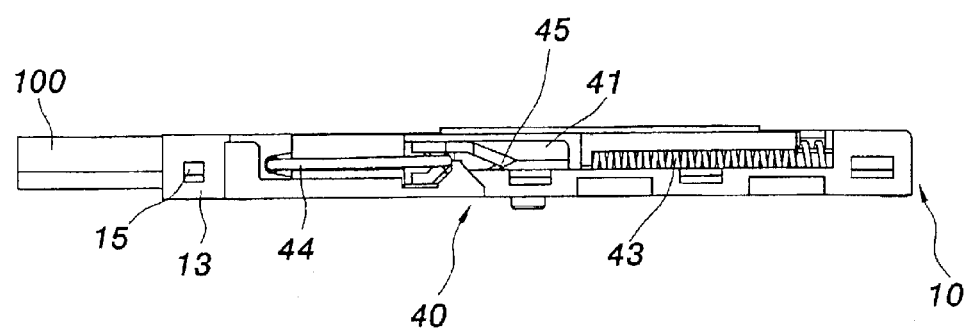
FIG. 5 is a side view of the ejection mechanism of the present invention during insertion of a card.
Figure 6:
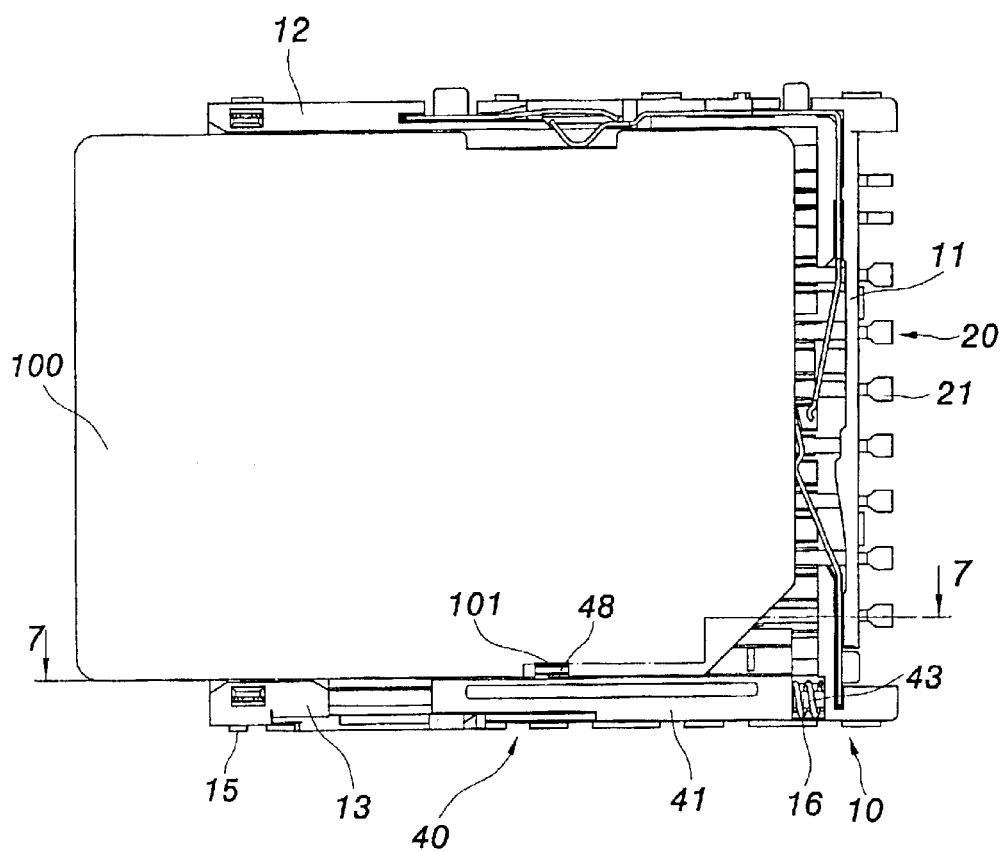
FIG. 6 is a top view of the ejection mechanism of the present invention during insertion of a card.
Figure 7:
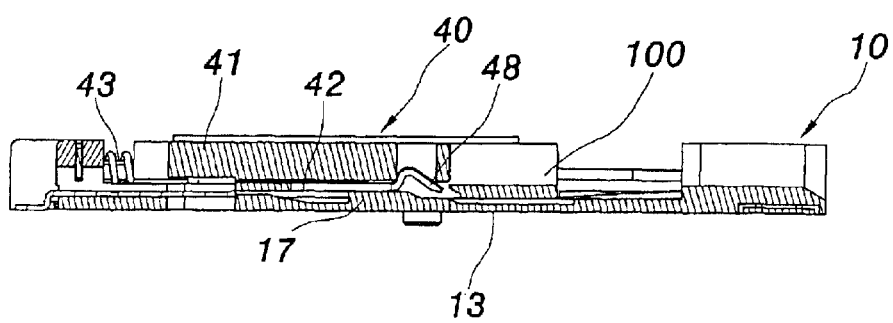
FIG. 7 is a cross-sectional view of the portion defined by lines "7-7" in FIG. 6.

As seen in FIGS. 5–7, when a user inserts electronic card 100 into receiving space 14 of insulative housing 10, insulative housing 10 pushes slider 41 of ejection mechanism 40 forward; when electronic card 100 is moved forward, card 100 contacts contact portions 22 of terminals 20, guiding bar 44 moves along groove 45 for positioning the inserted card, and retention portion 48 of lock arm 42 moves into a slot 101. When slider 41 and lock arm 42 are moved forwardly, retention portion 48 moves toward support portion 17 and the distance between retention portion 48 and support portion 17 is decreased, so that the effective lever length of lock arm 42 is relatively short and the moment arm is correspondingly relatively short, hence retention portion 48 has a smaller elastic force during insertion of the card, thereby fixing the card 100 securely within the card connector.

Figure 8:
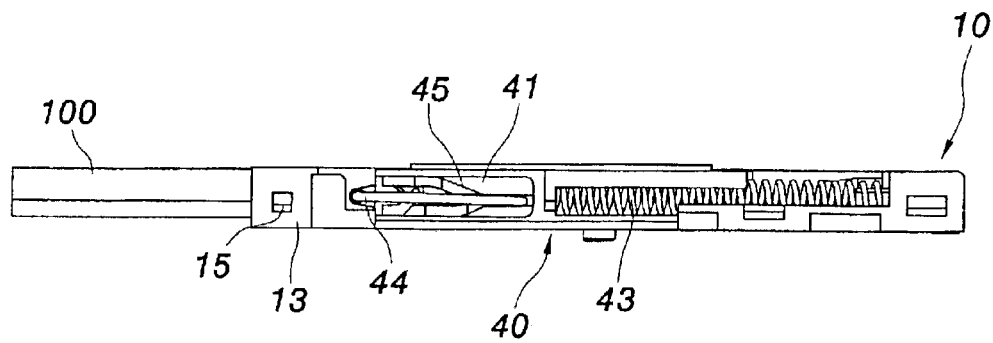
FIG. 8 is a side view of the ejection mechanism of the present invention during ejection of a card.
Figure 9:
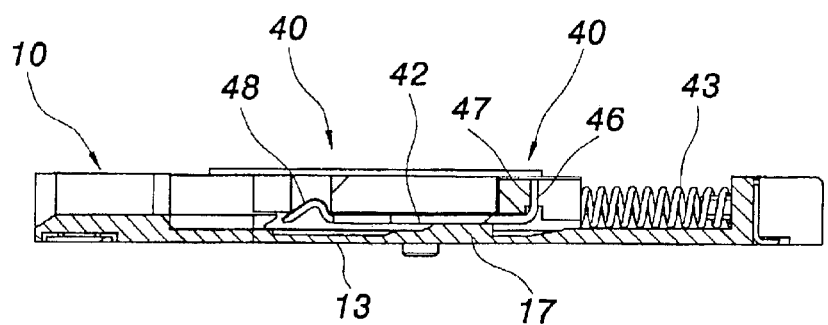
FIG. 9 is a cross-sectional view of the ejection mechanism of the present invention during ejection of a card.

As seen in FIGS. 8 and 9, when a user applies a pushing force to an inserted electronic card 100, the card ejecting function is realized through guiding bar 44 moving within groove 45. Slider 41 and lock arm 42 are pushed backward by spring element 43 and move retention portion 48 away from support portion 17, thereby increasing the distance between retention portion 48 and support portion 17 and effectively increasing the lever length and moment arm of lock arm 42, hence during ejection of the card, retention portion 48 has a relatively larger elastic force thereby more easily moved downwardly, and slot 101 of card 100 can be relatively easily removed from retention portion 48 of lock arm 42.

To sum, lock arm 42 of the present invention defines a retention force which is adjusted for locking electronic card 100, thereby providing different retention forces for an inserted or ejected card by adjusting the relative strength and moment arm of retention portion 48 of lock arm 42 and providing different locking capability so that retention 48 can relatively securely retain card 100 during insertion, and relatively easily reject card 100 during ejection of the card.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. An electronic card connector for receiving and ejecting an electronic card, the electronic card connector comprising
    a U-shaped insulative housing for receiving the electronic card, the housing including a base portion and two arm portions extending from each end of the base portion,
    an ejection mechanism for ejecting the card from the card connector including:
        a slider slidably mounted on one of the arm portions of the insulative housing, and including a groove defining the insertion and ejection movement of the card;
        a support portion extending upwardly from said one of said arm portions of the insulative housing;
        an elongated lock arm having a first end fixed to the slider and a second end free end for engaging in a slot of the electronic card, the second end of the lock arm including a retention portion for retaining the card during insertion and ejection of the card and a horizontal portion for engaging the support portion.

2. The electronic card connector as set forth in claim 1, further comprising a guiding bar adapted to move within the groove.

3. The electronic card connector as set forth in claim 1, further comprising an elastic spring element between the slider and the insulative housing for providing a bias force for the slider to move backward.

4. The electronic card connector as set forth in claim 1, wherein the lock arm is attached to the slider so that during insertion of a card, the retention portion of the lock arm is relatively close to the support portion of the arm portion and the effective lever length of the lock arm is relatively short, and during ejection of the card, the retention portion of the lock arm is relatively far from the support portion of the arm portion and the effective lever length of the lock arm is relatively long, whereby the electronic card is securely retained yet easily rejected during insertion and ejection of the card, respectively.

* * * * *